May 1, 1928.  
F. A. HAMEL  
BRAKE FOR CHILDREN'S VEHICLES  
Filed Nov. 8, 1926  
1,667,932

INVENTOR.  
FREDERICK A. HAMEL  
BY Whittemore Hulbert  
Whittemore & Belknap  
ATTORNEYS Patented May 1, 1928.

1,667,932

UNITED STATES PATENT OFFICE.

FREDERICK A. HAMEL, OF TOLEDO, OHIO, ASSIGNOR TO THE GENDRON WHEEL COMPANY, OF TOLEDO, OHIO, A CORPORATION OF OHIO.

BRAKE FOR CHILDREN'S VEHICLES.

Application filed November 8, 1926. Serial No. 147,066.

The invention relates to brake constructions adapted for children's vehicles and more particularly to a brake for a three-wheeled velocipede.

One of the objects of the invention is to provide a brake mounted in a location where it can readily be operated by the foot to apply braking pressure to the rear wheels of the velocipede. Another object is to provide a brake mechanism of simple construction which is effective in retarding the motion of the vehicle.

The invention will best be understood by referring to the drawings, in which

Figure 1:
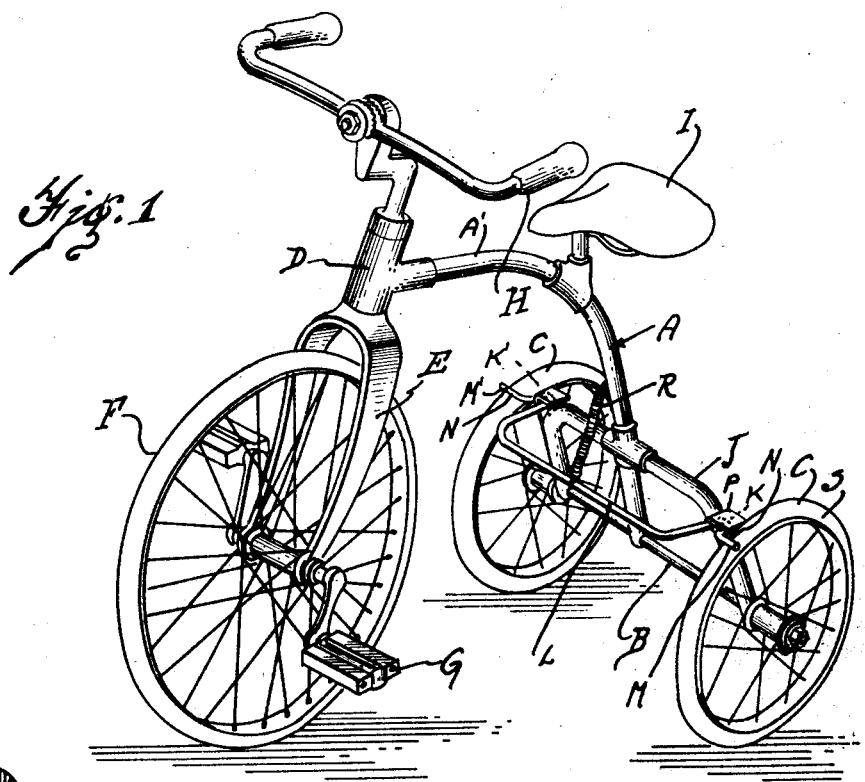
Figure 1 is a perspective view of a velocipede equipped with the novel brake.

The velocipede represented in Figure 1 is of conventional design comprising a frame A for supporting the rear axle B and rear wheels C, said frame having a bearing D at its forward end for mounting a front fork E, which in turn carries the front wheel F. The front wheel is provided with pedals G and is steered by means of handle bars H. The frame A comprises a tubular member A' curving upwardly and forwardly from the rear axle B and carrying the seat I in its intermediate portion. The frame also preferably includes the tubular cross member J connected to the central tubular member and curved downwardly and secured to the rear axle B adjacent the rear wheels C.

Figure 2:
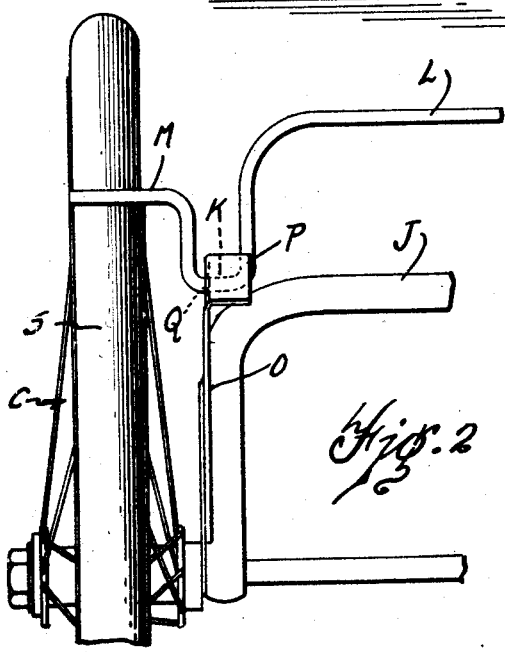
Figure 2 is a plan view of the brake mechanism.
Figure 3:
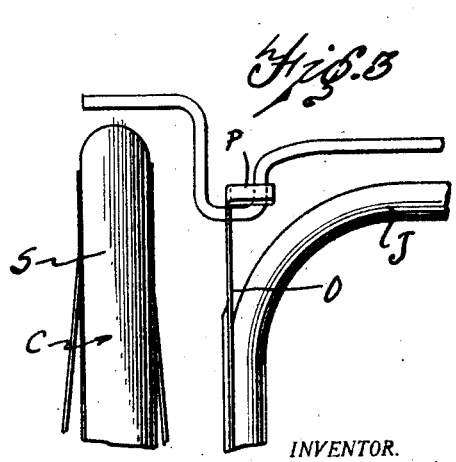
Figure 3 is a side elevation of the same.

The brake mechanism forming the subject matter of this invention is mounted on the frame below the seat I and extends forwardly from the frame toward the front wheel in such a position that the child can operate the same while riding the vehicle by removing one foot from the pedals and pressing with his heel on the brake mechanism. The brake is preferably made from a single rod bent into the form shown in Figure 2. This rod comprises the two substantially straight portions K and K' arranged in axial alignment, a U-shaped connecting portion L and the outer cranks M and M'. Each crank terminates in a transversely extending wheel-engaging portion N which extends over the periphery of the wheel and is disposed a slight distance above the same to provide clearance. The cranks M and M' are preferably arranged in a common plane, which extends upwardly and forwardly from the bearing portions and is arranged at an angle to the plane of the U-shaped portion. The brake member is pivotally mounted on the frame by means of brackets O which are attached to the lower portion of the frame member J and extend in a straight line upwardly therefrom. The upper ends of the brackets O are transversely turned at P, forming stops against which the U-shaped member L strikes. The brackets are apertured at Q to receive the bearing portions K and K'. A spring R attached to the center of the U-shaped portion L extends upwardly therefrom and is attached to the tubular member A'. The spring normally holds the U-shaped portion against the stops P, in which position the wheel engaging portions N are spaced slightly above the rear wheels. For operating the brake mechanism, pressure is applied on the U-shaped portion L in a downward direction, this causing the cranks to swing into engagement with the rear wheels. The wheels are preferably provided with hard rubber tires S.

From the above description it will be seen that while my improved brake mechanism is very simple in construction, it is nevertheless so arranged as to provide a positive braking action and is conveniently located with reference to the conventional parts of the velocipede as to be readily operated by a child.

What I claim as my invention is:

1. In a velocipede, the combination with a frame, a pair of rear wheels carried by said frame and a single steering front wheel journaled in said frame and provided with pedals, of a brake member pivotally mounted on said frame between said front and rear wheels in position to be engaged by the foot, said brake member being provided with wheel-engaging portions, and a spring normally holding said wheel-engaging portions in retracted position.

2. In a velocipede having a propelling and steering front wheel, a pair of rear wheels and a seat-carrying frame connecting said front and rear wheels and provided with a bifurcated tubular member adjacent the rear wheels, a brake rod having a U-shaped portion extending transversely of said bifurcated frame toward said front wheel, said rod having aligned bearing portions mounted in said frame, and arms extending outwardly from said bearing portions and then transversely over the periphery of said rear wheels.

3. In a velocipede, the combination with a frame, a pair of rear wheels supported thereby, a single steering front wheel also supported thereby, and a seat arranged on said frame above said rear wheels, of a pair of brackets secured to said frame and extending radially of said rear wheels and adjacent the same, said brackets being provided with aligned apertures, a brake rod having aligned bearing portions extending through said apertures, said rod having an intermediate connecting portion extending toward said front wheel, arms extending outwardly from said bearing portion and then transversely over the periphery of said rear wheels, a spring between said frame and brake rod for retracting the latter, and a stop carried by one of said brackets for limiting the retracting movement of said brake rod.

4. In a velocipede, the combination with a pair of rear wheels, a single steering front wheel, a frame connecting said wheels provided with a bifurcated rear portion, and a seat carried by said frame above said rear wheels, of a brake member comprising a rod having aligned bearing portions rotatably mounted in said frame, said rod having a U-shaped intermediate portion extending forwardly from said bearing portion toward said front wheel and located below said seat, a spring normally holding said U-shaped portion in upward position, and crank arms extending outwardly from said bearing portions and having transversely bent ends for engaging said rear wheels.

5. In a velocipede, the combination with a frame having a bifurcated rear portion, a pair of rear wheels carried by said bifurcated portion, a steering front wheel carried by said frame and a seat mounted on said frame above said rear wheels, of a brake member comprising a rod having aligned bearing portions pivotally mounted on said frame adjacent said rear wheels, said rod being bent to form a U-shaped intermediate portion lying in a plane extending forwardly from said bearing portions, and a pair of integral crank arms extending from the opposite bearing portions, said crank arms having laterally bent ends extending from the periphery of the rear wheels and lying in a plane extending at an angle to the plane of said U-shaped portion.

6. In a velocipede, a frame having a tubular member extending upwardly and forwardly, a two-wheeled rear axle mounted on the lower portion of said frame, a steering front wheel journaled at the upper end of said frame, frame members extending oppositely from said tubular member and connected to said rear axle, brackets attached to said frame members and extending upwardly from said axle, said brackets having apertures in their upper portions, a rod having aligned bearing portions extending through said apertures, said rod having an integral U-shaped intermediate portion extending forwardly from said front wheel and having integral crank arms at the outer ends thereof adapted to engage the rear wheels, and a spring between said U-shaped portion and said tubular member.

7. In a child's vehicle having a steering front wheel, the combination with a frame and a two-wheeled axle secured thereto, of aligned bearings arranged on opposite sides of said frame, a brake rod having aligned bearing portions engaging frame bearings, said rod having a U-shaped intermediate portion extending toward said front wheel in position to be readily engaged by the foot, said intermediate portion connecting said bearing portions and formed with crank portions, each provided with a transversely bent portion adapted to engage a wheel upon rotative movement of said rod in said bearings, and yieldable means connected to said frame and to said rod normally holding the latter in inoperative position.

8. In a child's vehicle, the combination with a frame and a two-wheeled axle secured thereto, of a brake rod having a substantially U-shaped portion positioned forwardly of said axle and having end portions constituting brake shoes adapted to engage said wheels, brackets attached to said frame constituting bearings for said brake rod and having inwardly extending portions forming stops for said brake rod, and yieldable means connected to the latter for normally holding the same against said stops.

In testimony whereof I affix my signature.

FREDERICK A. HAMEL.